(12) United States Patent
Ouchi et al.

(10) Patent No.: US 7,848,017 B2
(45) Date of Patent: Dec. 7, 2010

(54) MICROSCOPE DEVICE

(75) Inventors: Yumiko Ouchi, Yokohama (JP); Hisao Osawa, Kashiwa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/715,994

(22) Filed: Mar. 2, 2010

(65) Prior Publication Data

US 2010/0157422 A1  Jun. 24, 2010

Related U.S. Application Data

(63) Continuation of application No. PCT/JP2008/065012, filed on Aug. 22, 2008.

(30) Foreign Application Priority Data

Sep. 5, 2007 (JP) ............................. 2007-230030

(51) Int. Cl.
*G02B 21/06* (2006.01)
(52) U.S. Cl. ...................................... 359/385; 359/384
(58) Field of Classification Search .......... 359/384–390
See application file for complete search history.

(56) References Cited

U.S. PATENT DOCUMENTS

RE38,307 E    11/2003  Gustafsson et al.

FOREIGN PATENT DOCUMENTS

| JP | A-11-242189 | 9/1999 |
| JP | A-2006-268004 | 10/2006 |
| WO | WO 2007/043313 A1 | 4/2007 |
| WO | WO 2007/043382 A1 | 4/2007 |

OTHER PUBLICATIONS

Gustafsson et al., "Doubling the lateral resolution of wide-field fluorescence microscopy using structured illumination," Proceedings of SPIE, 2000, vol. 3919, pp. 141-150.
Lukosz, "Optical Systems with Resolving Powers Exceeding the Classic Limit. II," Journal of the Optical Society of America, 1967, vol. 57, No. 7, pp. 932-941.
International Preliminary Report on Patentability issued in International Application No. PCT/JP2008/065012 on Mar. 30, 2010.
International Search Report issued in International Application No. PCT/JP2008/065012 on Nov. 25, 2008 (with English-language translation).

*Primary Examiner*—Joshua L Pritchett
(74) *Attorney, Agent, or Firm*—Oliff & Berridge PLC

(57) ABSTRACT

A microscope device including a coherent light source, an illuminating optical system which has light beam splitting means that splits the coherent light source into light beams and phase-modulating means disposed near a pupil conjugate plane and adapted for modulating the phases of two of the light beams and projects illuminating light spatially modulated into an interference fringe structure by causing the two light beams to interfere with each other near the plane of a sample, an imaging optical system for forming an image of the sample with diffracted light, imaging means, and image processing means for creating a sample image by computation of the image captured by the imaging means each time the phase of the spatial modulation is modulated.

6 Claims, 13 Drawing Sheets

(a)

(b)

(c)

(a)

(b)

MICROSCOPE DEVICE

This is a Continuation of International Application No. PCT/JP2008/065012 filed Aug. 22, 2008, which claims the benefit of Japanese Patent Application No. 2007-230030 filed Sep. 5, 2007. The disclosure of the prior applications is hereby incorporated by reference herein in its entirety.

TECHNICAL FIELD

The present invention relates to a microscope device, particularly to a high-resolution microscope that can realize super resolution in a lateral direction.

BACKGROUND ART

Higher spatial resolution is required in the field of observation or measurement of a micro structure of a sample. One of methods for enhancing lateral resolution of the sample is as below. In the method, in order to form an image of light having a high spatial frequency component in light diffracted from the sample, a certain type of modulation is performed to diffracted light or illumination light in the proximity of a sample surface or in a position conjugate with the sample surface in an illumination optical system. Then demodulation corresponding to the performed modulation is performed in a position substantially conjugate with the sample surface in an image-formation optical system. A Lukosz method (W. Lukosz, "Optical systems with resolving powers exceeding the classical limit. II", Journal of the Optical Society of America, Vol. 37, PP. 932 (1987)) (Non-Patent Document 1) is well known in days gone by as such a method, and recently there are methods disclosed in Japanese Patent Application Laid-Open No. 11-242189 (Patent Document 1) and U.S. Pat. RE38307 (Patent Document 2).

In the Lukosz method, diffraction gratings are disposed in the proximity of the sample and in a position substantially conjugate with the sample surface in the image-formation optical system, respectively, and the diffraction gratings are moved in a conjugate manner. The diffraction grating disposed in the proximity of the sample surface can cause the diffracted light, which cannot originally impinge on an objective lens of the image-formation optical system, to reach an image plane. The light diffracted by the diffraction grating disposed in the proximity of the sample surface is demodulated by the diffraction grating disposed in the position substantially conjugate with the sample surface in the image-formation optical system, and an image of the light is formed as an original diffraction component. The light having high spatial frequency component, which does not originally contribute to the image formation, reaches the image plane by means of the diffraction grating disposed in the proximity of the sample surface. As a result, spatial resolution higher than usual can be obtained.

A sixth embodiment disclosed in Japanese Patent Application Laid-Open No. 11-242189 is an example in which the Lukosz method is applied to a fluorescent observation device. In the optical system of the sixth embodiment disclosed in Japanese Patent Application Laid-Open No. 11-242189, illumination light emitted from a coherent light source is split by light beam splitting means such as a diffraction grating, and each of the illumination light beams is collected to a pupil position of an objective lens. Then, the illumination light beams are delivered from the objective lens as parallel light beams having different angles, and the parallel light beams overlap in the proximity of a sample, to form an interference fringe.

In the sixth embodiment disclosed in Japanese Patent Application Laid-Open No. 11-242189, spatial modulation is performed by the illumination light instead of disposing the diffraction grating in the proximity of the sample in the Lukosz method. Like the Lukosz method, advantageously the diffracted light including a spatial frequency component of shape information of the sample that cannot originally be transmitted only by the image-formation optical system can be involved in the image formation. Phases of the split illumination light beams are relatively modulated, and the interference fringe is moved on the sample to obtain plural images. Then an image can be formed by image arithmetic processing of the obtained images. Specifically the diffraction grating is moved perpendicular to an optical axis to perform the phase modulation, or a wedge-shape prism is inserted in one of optical paths of the illumination light and the wedge-shape prism is moved perpendicular to the optical axis to perform the phase modulation.

In the method disclosed in U.S. Pat. RE38307, after illumination light is introduced from a coherent light source using an optical fiber, the illumination light is split by light beam splitting means such as a diffraction grating, illumination light beams are collected to the pupil position of the objective lens, and an interference fringe is formed in the proximity of the sample. A high-frequency component of shape information of the sample that cannot originally be transmitted only by the image-formation optical system can be involved in the image formation by the illumination light modulated into a fringe shape. Similarly, plural images are obtained and subjected to image arithmetic processing to form an image of the sample. In the method disclosed in U.S. Pat. RE38307, when plural images are obtained in order to form an image of the sample, not only phase modulation is performed to the illumination light beams, but also an orientation of the interference fringe of the illumination light is changed. This is attributed to the following reason. The high-frequency component can be involved in the image formation only in a structure having the same direction as that of the interference fringe of the illumination light. Accordingly, in order to reproduce a shape of the two-dimensionally spread sample it is necessary to obtain plural images while changing the direction of the interference fringe and combine the plural images.

Patent Document 1: Japanese Patent Application Laid-Open No. 11-242189

Patent Document 2: U.S. Pat. RE38307

Non-Patent Document 1: Journal of the Optical Society of America, Vol, 37, PP. 932 (1967)

Non-Patent Document 2: M. G. L. Gustafsson, D. A. Agard, J. W. Sedat "Doubling the lateral resolution of wide-field fluorescence microscopy using structured illumination", Proceedings of the SPIE—The International Society for Optical Engineering (2000) vol. 3919, p. 141-50.

However, in the configuration of the conventional methods, because the phase modulation is performed by moving an element (such as a diffraction grating) that performs the phase modulation in a direction perpendicular to the optical axis, images cannot be obtained rapidly. Particularly, when a sample is a living biological sample, it is essential to obtain images rapidly. However, in the conventional methods, images cannot be obtained rapidly enough.

In the Lukosz method, it is necessary that the two diffraction gratings on the sample side and the imaging plane side be continuously moved while being synchronous with each other, which results in an extremely complicated mechanism.

In the method disclosed in U.S. Pat. RE38307, the diffraction grating is rotated in order to obtain two-dimensional super resolution. The diffraction grating is moved as follows on the assumption that the orientation of the interference fringe is changed and set to three directions an angle between adjacent two of which is 120°. That is, an image is obtained in a reference position, two images are obtained after having linearly moved the diffraction grating in the direction perpendicular to the optical axis using a linear actuator, the diffraction grating is returned to the optical axis position, an image is obtained after having rotated the diffraction grating by 120° using a rotary motor, two images are obtained after having moved the diffraction grating in the direction perpendicular to the optical axis, the diffraction grating is returned to the optical axis position, an image is obtained after having rotated the diffraction grating from a reference to 240° using the rotary motor, two images are obtained after having moved the diffraction grating in the direction perpendicular to the optical axis, the diffraction grating is returned to the optical axis position, and the diffraction grating is returned to the reference position using the rotary motor.

A total of nine images are obtained by a combination of the rotations and the shifts, and one sample image is obtained by the subsequent arithmetic processing. At this point, there are two cases, that is, the case in which the linear actuator including the diffraction grating is rotated and the case in which the diffraction grating alone is rotated while the linearly stepping direction of the diffraction grating is always set to one direction of the reference angle. In the former, because a mass of the object to be rotated is large, a large driving torque is required, and it is difficult to quickly stop the object. In the latter, it is necessary that the rotating angle be correctly measured to obtain the correct amount for stepping the diffraction grating. Therefore, a measurement and arithmetic time is required.

In the method disclosed in Japanese Patent Application Laid-Open No. 11-242189 in which the wedge-shape prism is inserted in one of the optical paths and moved in the direction perpendicular to the optical axis, it is necessary that the wedge-shape prism equipped with a moving mechanism be rotated according to the rotation of the two light beams, or it is necessary that the angle be measured to obtain the movement amount. Therefore, a stopping time or a measurement and arithmetic time is required.

In view of the foregoing, an object of the invention is to provide a super-resolution microscope device, in which spatially modulated illumination light is used to involve high-frequency components of the sample shape in the image formation and the spatial modulation is demodulated by arithmetic processing of obtained images to obtain a high-resolution sample image, and which can obtain the images rapidly.

DISCLOSURE OF THE INVENTION

In a first aspect of the invention, there is provided a microscope device including:

an illumination optical system that includes a coherent light source, light beam splitting means for splitting a light beam from the coherent light source into a plurality of light beams, and phase modulation means for performing phase modulation to two light beams in the plurality of light beams collected into a pupil conjugate plane, the phase modulation means being disposed in a proximity of the pupil conjugate plane, the illumination optical system illuminating a surface of a sample with illumination light in which the two light beams are spatial-modulated into an interference fringe structure by interference of the two light beams in the proximity of the surface of the sample;

an image-formation optical system that forms an image of light from the sample to which the modulation is performed by the illumination light;

imaging means; and image processing means for producing a sample image by performing arithmetic processing to an image, the image being taken by the imaging means each time the phase modulation is performed to the two light beams, wherein the phase modulation means is an optical member that is set such that when light passes respective regions of the optical member different phase differences are generated in the respective regions, the phase modulation means changes the phase difference between the two light beams by rotation of the optical member, and the phase modulation means satisfies the following conditions:

(1) the number of regions X and the number of times of the spatial modulation N satisfy the following equation:

$$X=[N/2]+1 \quad (1)$$

where [ ] is a Gaussian sign, and the Gaussian sign indicates a maximum integer that does not exceeds a numerical value described in [ ], (2) (a) assuming that θ is a larger one of potential angles of the two light beams when the optical member is viewed from a rotating axis, (b) each region of the optical member is of sectorial shape, a center of the sectorial shape is on the rotating axis and a center angle has a minimum value of θ, the center angle has a maximum value of $\{2\pi-(X-1)\theta\}$, the region of sectorial shape has such a radius as includes the light beam located farther away from the rotating center in the two light beams and can include regions through which the two light beams pass when being rotated about the rotating axis, and (c) the regions do not overlap each other.

In a second aspect of the invention, there is provided a microscope device including:

an illumination optical system that includes a coherent light source, light beam splitting means for splitting a light beam from the coherent light source into a plurality of light beams, and phase modulation means for performing phase modulation to three light beams in the plurality of light beams collected into a pupil conjugate plane, the phase modulation means being disposed in a proximity of the pupil conjugate plane, the illumination optical system illuminating a surface of a sample with illumination light in which the three light beams are spatial-modulated into an interference fringe structure by interference of the three light beams in the proximity of the surface of the sample;

an image-formation optical system that forms an image of light from the sample to which the modulation is performed by the illumination light;

imaging means; and image processing means for producing a sample image by performing arithmetic processing to an image, the image being taken by the imaging means each time the phase modulation is performed to the three light beams, the microscope device, wherein the phase modulation means is an optical member that is set such that when light passes respective regions of the optical member different phase differences are generated in the respective regions, the phase modulation means changes the phase difference between the three light beams by rotation of the optical member, and the phase modulation means satisfies the following conditions:

(1) the number of regions X and the number of times of the spatial modulation N satisfy the following equation:

X=N (when N is an odd number)

$X=N+1$ (N is an even number)    (2)

(2)(a) assuming that θ is a largest one of potential angles of the two light beams when the optical member is viewed from a rotating axis, (b) each region of the optical member is of sectorial shape, a center of the sectorial shape is on the rotating axis and a center angle has a minimum value of θ, the center angle has a maximum value of $\{2\pi-(X-1)\theta\}$, the region of sectorial shape has such a radius as includes the light beam located farthest away from the rotating center in the three light beams and can include regions through which the three light beams pass when being rotated about the rotating axis, (c) one of the regions of the optical member is formed into a shape through which the three light beams are simultaneously transmitted, and (d) the regions of the optical member do not overlap each other.

In the first and the second aspects the conditions (1) and (2) determine the minimum number of regions to realize necessary phase states in which a phase difference between the two light beams or phase differences between the three light beams are changed and images are taken, by rotating a phase plate.

The number of divided regions increases unless the conditions are satisfied. This leads to a complicated mask shape or the increased number of steps during production, and therefore an increase in production cost. The increased number of regions means that the central angle of one region is inevitably narrowed to tighten a production tolerance.

In a third aspect of the invention, in the microscope device according to the first or second aspect, preferably the phase modulation means includes blocking means for blocking illumination light unnecessary for the spatial modulation.

In a forth aspect of the invention, in the microscope device according to the first or second aspect, preferably the phase modulation means includes attenuating means for attenuating illumination light unnecessary for the spatial modulation.

According to the invention, a super-resolution microscope device can be provided, in which spatially modulated illumination light is used to involve high-frequency components of the sample shape in the image formation and the spatial modulation is demodulated by arithmetic processing of obtained images to obtain a high-resolution sample image, and which can obtain the images rapidly.

| Explanations of Letters or Numerals | |
|---|---|
| 1 | optical fiber |
| 2 | collector lens |
| 3 | diffraction grating |
| 4 | lens |
| 5 | phase plate |
| 6 | 0-order and high-order cut plate |
| 6a | oblique light portion |
| 6b | transmission portion |
| 7 | lens |
| 8 | field stop |
| 9 | lens |
| 10 | excitation filter |
| 11 | dichroic mirror |
| 12 | objective lens |
| 13 | sample |
| 14 | barrier filter |
| 15 | second objective lens |
| 16 | imaging surface |
| 21 | imaging means |
| 22 | arithmetic device |
| 23 | image display device |
| 31 | filter |
| 41 | rotating mechanism |
| 42 | rotating mechanism |
| 301 | diffraction grating |
| 601 | high-order cut plate |

BEST MODE FOR CARRYING OUT THE INVENTION

Exemplary embodiments of the invention will be described below with reference to the drawings. Hereinafter, the same configuration element as that illustrated in the previous drawing is designated by the same numeral, and the overlapping description will be omitted.

One of features of the embodiments of the invention is that the phase modulation can be performed by rotation of the phase modulation element disposed in the proximity of the pupil conjugate position. The position in which the two light beams or three light beams are spatially completely separated is the pupil conjugate position, and each of the light beams is collected to extremely reduce a light beam section. Therefore, the disposed element may have a smaller size. Further, the element can have a light beam selecting function which removes noise (when a diffraction grating is used as the light beam splitting means, the 0-order light and unnecessary high-order lights) and transmits necessary light beams alone. The phase modulation element is optimally disposed in the pupil conjugate position. However, the phase modulation element may be disposed at a position slightly deviated from the pupil position (in the proximity), as long as the deviation does not have an influence on the effect of the invention from a standpoint of design.

Embodiment 1.1

Figure 1:
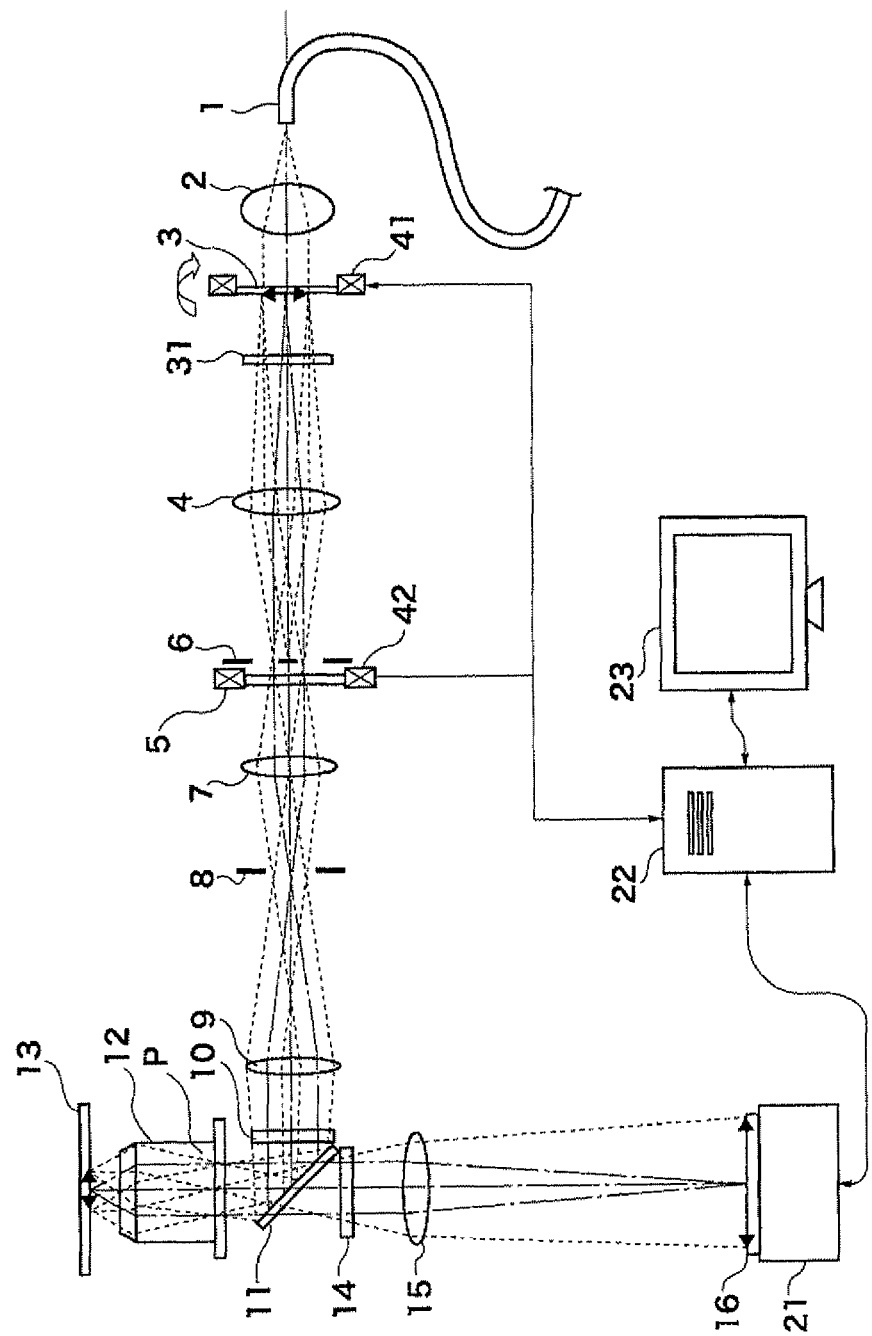
FIG. 1 is a view showing a schematic diagram of an optical system of a microscope device according to Embodiment 1.1 of the invention.

FIG. 1 is a view showing a schematic diagram of an optical system of a microscope device according to Embodiment 1.1 of the invention. The light emitted from a light source (not illustrated) is guided by an optical fiber 1, and the light is converted into parallel light by a collector lens 2. Diffracted lights are generated by a diffraction grating 3, the diffracted lights are transmitted through a filter 31, and reaches a pupil conjugate plane formed by a lens 4 (the pupil conjugate plane is also a pupil conjugate plane of a later-described objective lens 12).

The diffraction grating 3 has one-dimensional periodic structure in the direction orthogonal to the sheet of FIG. 1. The diffraction grating may have a structure formed by density (transmittance) or a structure formed by a step (phase difference). Preferably a phase type diffraction grating should be used because of high diffraction efficiency of ±1-order light.

Figure 2:
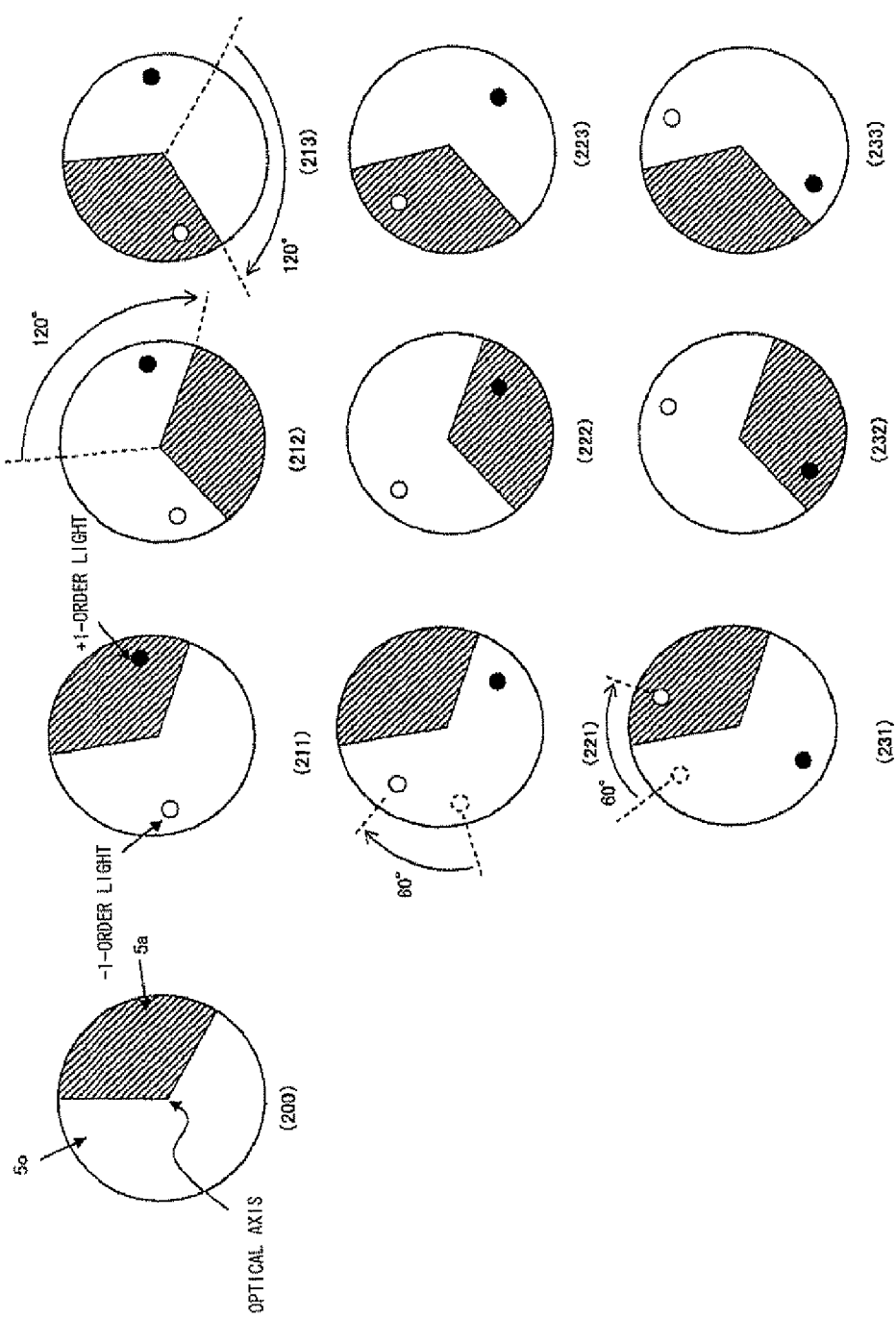
FIG. 2 is a view illustrating a phase plate used in Embodiment 1.1 when the phase plate is viewed from an optical axis direction.

A phase plate 5 is disposed in the proximity of the pupil conjugate plane. FIG. 2 is a view illustrating the phase plate 5 when the phase plate 5 is viewed from an optical axis direction. As illustrated in FIG. 2(200), the phase plate 5 is divided into two regions 5a and 5o. In order to perform the phase modulation necessary for the image processing, the phase plate 5 is rotated about the optical axis, and two light beams pass sequentially through the regions 5a and 5o to modulate a phase difference between the two light beams.

The phase plate 5 is rotated about the optical axis with a gear or the like by a rotary motor disposed outside the optical path. However, the method for rotating the phase plate 5 is not particularly limited. Thus, a predetermined phase difference can be provided when the two light beams pass through the pupil conjugate position. In Embodiment 1.1, a $SiO_2$ film having a predetermined thickness is evaporated onto the region 5a, such that a phase is delayed by $2\pi/3$ with respect to the light passing through the region 5o.

In a film having a refractive index n, a film thickness t that generates a phase difference $\phi$ of the light having a wavelength $\lambda$ is expressed as follows:

$$t=\phi\times\lambda/\{2\times\pi\times(n-1)\}$$

In Embodiment 1.1, the wavelength of the light source is set to 532 nm. The film thickness corresponding to the phase difference of $2\pi/3$ is 385 nm, because the refractive index of the $SiO_2$ film for 532 nm is 1.46.

In Embodiment 1.1, the $SiO_2$ film is formed by the evaporation. Any material may be used as long as light having the light source wavelength has the sufficient transmittance with respect to the material. For example, a $MgF_2$ film may be used. Alternatively, a $SiO_2$ substrate may be etched or mechanically ground/polished to produce a step, thereby generating the phase difference.

When the rotation of the phase plate 5 is stopped at the rotating angle illustrated in FIG. 2(211) for the regions through which the ±1-order light passes, the +1-order light is delayed by $2\pi/3$ with respect to the −1-order light, and therefore the phase difference of $-2\pi/3$ exists between the +1-order light and the −1-order light. When the phase plate 5 is further rotated and stopped at the position illustrated in FIG. 2(212), the phase difference becomes zero. When the phase plate 5 is further rotated and stopped at the position illustrated in FIG. 2(213), the phase difference becomes $+2\pi/3$. The phase plate 5 is rotated as follows, and a three step modulation can be performed, in which a phase difference between the two light beams is changed by $2\pi/3$ between two succeeding steps.

TABLE 1

| Rotational position | Phase difference between +1-order light and −1-order light |
|---|---|
| (211) | $-2\pi/3 = 4\pi/3$ |
| (212) | 0 |
| (213) | $2\pi/3$ |

FIGS. 2(221), 2(222), and (223) illustrate the state in which the diffraction grating is rotated to rotate the directions of the two light beams by 60°. Similarly the phase plate 5 can be repeatedly rotated by 120° to modulate the phase difference between the two light beams in the three-step manner. FIGS. 2(231), 2(232), and 2(233) illustrate the state in which the two light beams are further rotated by 60°. Similarly the phase plate 5 can be repeatedly rotated by 120° to modulate the phase difference between the two light beams in the three-step manner.

At this point, since the sample is faded into a fringe pattern for the uneven phase change amount, desirably the phase difference should be changed in a period of ⅓ as evenly as possible.

Figure 3:
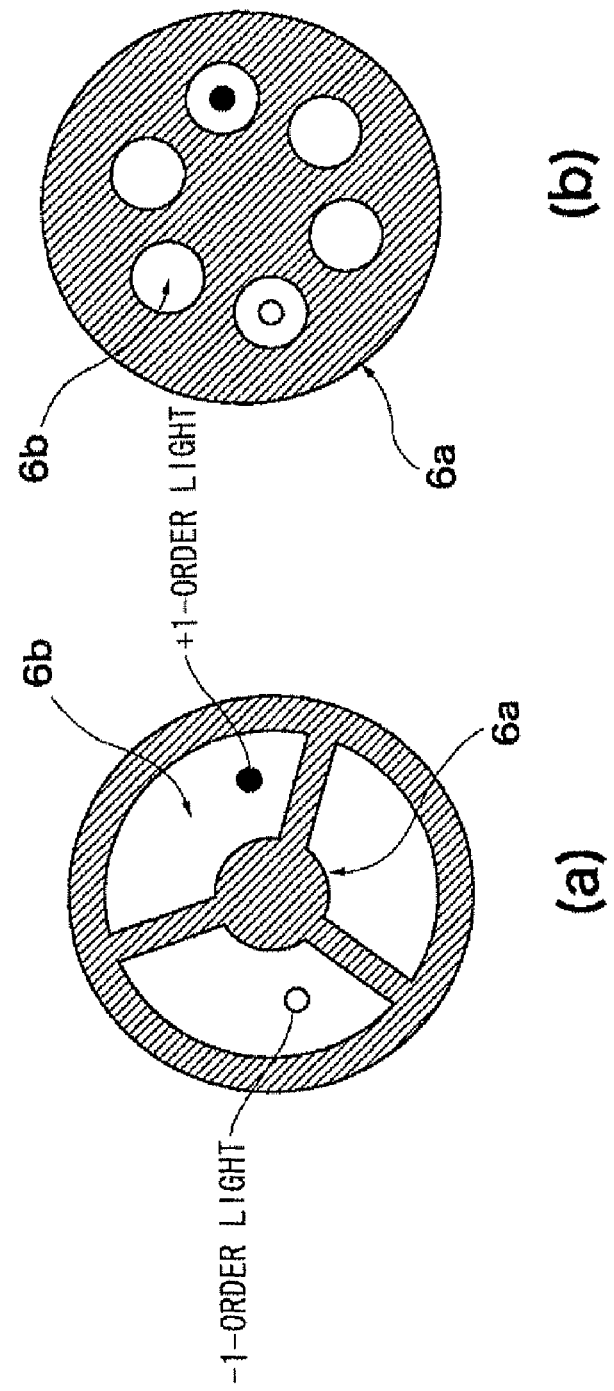
FIG. 3 is a view illustrating a 0-order and high-order cut plate when the 0-order and high-order cut plate is viewed from a direction perpendicular to an optical axis.

A 0-order and high-order cut plate 6 of FIG. 1 is disposed in the proximity of the phase plate 5. The proximity means that the 0-order and high-order cut plate 6 may be separated from the phase plate 5 to some extent, and the proximity is a range where a change in optical characteristic is allowable from a standpoint of design condition. FIG. 3 is a view illustrating the 0-order and high-order cut plate 6 when the 0-order and high-order cut plate 6 is viewed from the optical axis direction. A light blocking portion 6a cuts the 0-order light and unnecessary high-order light. An effective diameter through which the necessary light beam passes is secured in a transmission portion 6b.

In FIG. 3, a light blocking member is used as the region 6a to completely block the 0-order light and the unnecessary high-order lights. However, the invention is not limited to the configuration of FIG. 3. For example, in producing the phase plate 5, a light blocking film may be evaporated onto the region through which unnecessary light beams pass and the phase plate 5 and the 0-order and high-order cut plate 6 may be integrated.

In place of cutting the 0-order light and the unnecessary high-order lights, an attenuator may be used to weaken the unnecessary lights.

Referring to FIG. 1, the light passing through the phase plate 5 and 0-order and high-order cut plate 6, reaches a sample conjugate plane formed by a lens 7 in the position of a field stop 8. Then the light forms two spots at a pupil P of an objective lens 12 through a lens 9, an excitation filter 10, and a dichroic mirror 11 that divides and combines an epi-illumination system and an image formation system. The two spots are formed in a substantial outermost circumferential portion of the pupil P of the objective lens 12. Lights from the two spots become parallel light beams each of which has an angle of maximum NA when leaving the objective lens 12 and illuminate a surface of a sample 13. At this point, because the two light beams are coherent, the two light beams illuminate the sample surface with a structure of an interference fringe having equal intervals. The illumination light having the fringe structure is called structured illumination light.

When the sample 13 is illuminated with the structured illumination light, a periodic structure of the illumination light and a periodic structure of the sample 13 interfere with each other to generate a Moire interference fringe. The Moire interference fringe can impinge on the objective lens 12, because the Moire interference fringe has a frequency lower than an original frequency although the Moire interference fringe includes high-frequency shape information on the sample 13. The formed image is obtained, and an unknown shape of the sample is obtained and visualized through arithmetic and restoring processing of a known periodic structure of the illumination light. This is a principle of a structured illumination super-resolution microscope.

The light reflected from the sample 13 is converted into the parallel light through the objective lens 12, and the light is transmitted through the dichroic mirror 11. The light passes through the barrier filter 14, and forms, by a second objective lens 15, a sample image on an imaging surface 16 of an imaging means 21 such as a CCD camera.

However, as described above, the obtained image is the image illuminated with the modulated illumination light. So, an image storage and arithmetic device 22 performs image processing and demodulation of the obtained image using well-known image arithmetic method to restore an image of the sample. Thus, an image of the sample is obtained, and a super-resolution image of the sample can be displayed on an image display device 23.

When the original image is restored by the image processing, preferably images should be taken while the phase of the illumination interference fringe is modulated at least three times for the same sample. The reason is that the modulated image includes three unknown parameters, that is, 0-order light, +1-order light, and −1-order light in the information of a frequency component of the sample obtained by diffraction using structured illumination, and the number of relations greater than the that of the unknowns is required in order to obtain the unknowns by the arithmetic processing.

In the configuration of Embodiment 1.1, a rotating mechanism 41 that rotates the directions of the two light beams and a rotating mechanism 42 that performs the phase modulation are disposed separately from each other. So, each of the rotating mechanism 41 and the rotating mechanism 42 can be rotated with a small driving torque, and the rotation and the stopping can quickly be performed. As to the phase plate 5, a rotating speed and an exposure time are synchronized with each other, such that an image can be exposed without stopping. That is, the exposure is completed while one of the light beams exists in the region 5a (state of FIG. 2(211)), and the phase plate 5 is continuously rotated while the image is transferred from the imaging element to the image arithmetic device. The phase plate 5 is in the state of FIG. 2(212) when the next exposure is started, and the other light beam exists in the region 5a (state of FIG. 2(213)) when the third exposure is started. In such cases, a sectorial center angle of the region 5a should preferably be set to about 90 degrees and be smaller than that of FIG. 2, such that constant-speed rotation can be realized.

Thus, the phase modulation of the illumination light is performed rapidly, so that a super-resolution image of a living biological sample can be obtained.

For Embodiment 1.1, the number of phase difference steps in which an image is obtained is three and the number of regions is two. Therefore, assuming that [ξ] is an integer that does not exceed the following equation is obtained, and the conditional expression (1) is satisfied:

[$N/2$]+1=[(3/2)]+1=2

In the configuration of Embodiment 1.1, the 0-order and high-order cut plate 6 is disposed in the pupil conjugate position, and the phase plate 5 is disposed on the sample side of the pupil conjugate position. However, the invention is not limited to the configuration of Embodiment 1.1. For example, the order may be reversed and the phase plate 5 may be disposed on the light source side, or the 0-order and high-order cut plate 6 and the phase plate 5 may be disposed in different pupil conjugate positions.

Embodiment 1.2

Embodiment 1.2 of the invention will be described below. In Embodiment 1.2 and subsequent embodiments 1.3 to 1.6, the configuration of the microscope device is similar to that of Embodiment 1.1 except for the phase plate 5. In Embodiment 1.2, the number of phase difference steps in which an image is obtained is four.

Three unknowns exist in the image processing as described above. Further, there are many image-quality degradation factors such as an influence of uneven illumination or vibration, an influence of various aberrations, and a noise of the imaging element in obtaining microscopic images. Accordingly, a large number of data should preferably be obtained to perform noise reduction processing such as a least-square method.

Figure 4:
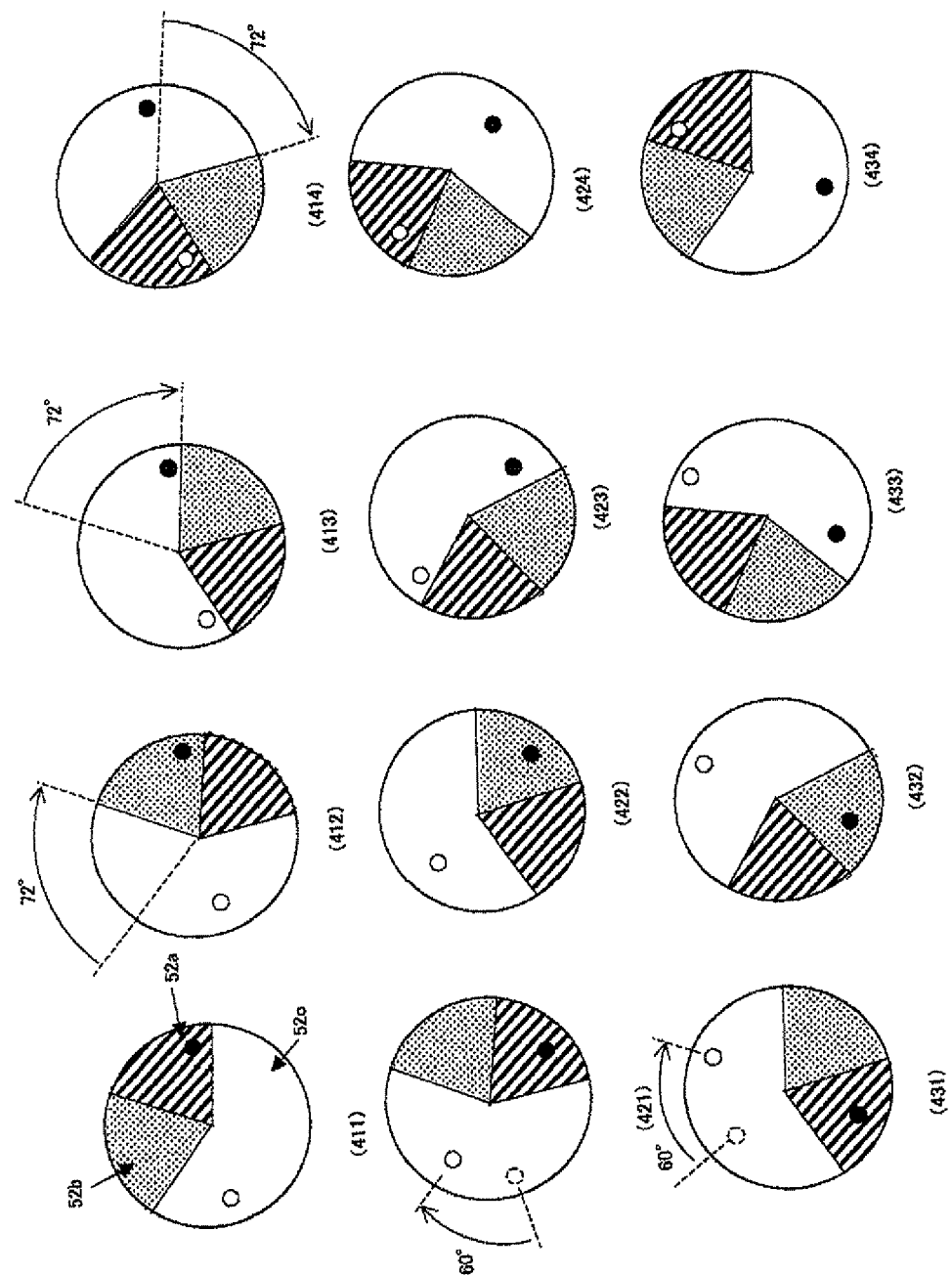
FIG. 4 is a view showing a schematic diagram of a phase plate used in Embodiment 1.2.

FIG. 4 illustrates an example of a phase plate 52 of Embodiment 1.2. The phase plate 52 includes three regions 52a, 52b, and 52o. In the region 52a, the $SiO_2$ film is evaporated with a thickness by which the phase is delayed by $\pi/2$ with respect to the region 52o. In the region 52b, the $SiO_2$ film is evaporated with a thickness by which the phase is delayed by $\pi$ with respect to the region 52o. In Embodiment 1.2, as illustrated in TABLE 2, a four-step phase modulation can be performed, in which four rotational positions of the phase plate 52 correspond to the four steps and a phase difference is changed by $2\pi/4$ between two succeeding steps.

TABLE 2

| Rotational position | Phase difference between +1-order light and −1-order light |
|---|---|
| (411) | $-\pi/2 = 6\pi/4$ |
| (412) | $-\pi = \pi$ |
| (413) | 0 |
| (414) | $\pi/2 = 2\pi/4$ |

The same holds true for the rotational positions (421) to (424) and the rotational positions (431) to (434) in which the two light beams are rotated by 60°.

For Embodiment 1.2, the number of phase difference steps in which an image is obtained is four and the number of regions is three. Therefore, the following equation is obtained, and the conditional expression (1) is satisfied:

[$N/2$]+1=[4/2]+1=3

In Embodiment 1.2, the phase of the region 52a is delayed by $\pi/2$ with respect to the phase of the region 52o. A similar combination of phase differences is obtained when the film of the region 52a is formed with a thickness by which the phase of the region 52a is delayed by $3\pi/2$ with respect to the phase of the region 52o. However, when the film thickness increases, generally unevenness of the thickness is easy to generate. Therefore, in consideration of the ease of production, preferably the film thickness should be set as thin as possible.

Embodiment 1.3

Embodiment 1.3 of the invention will be described below. Embodiment 1.3 is an example of four steps like Embodiment 1.2. However, in Embodiment 1.3, the angle division of regions is changed.

Figure 5:
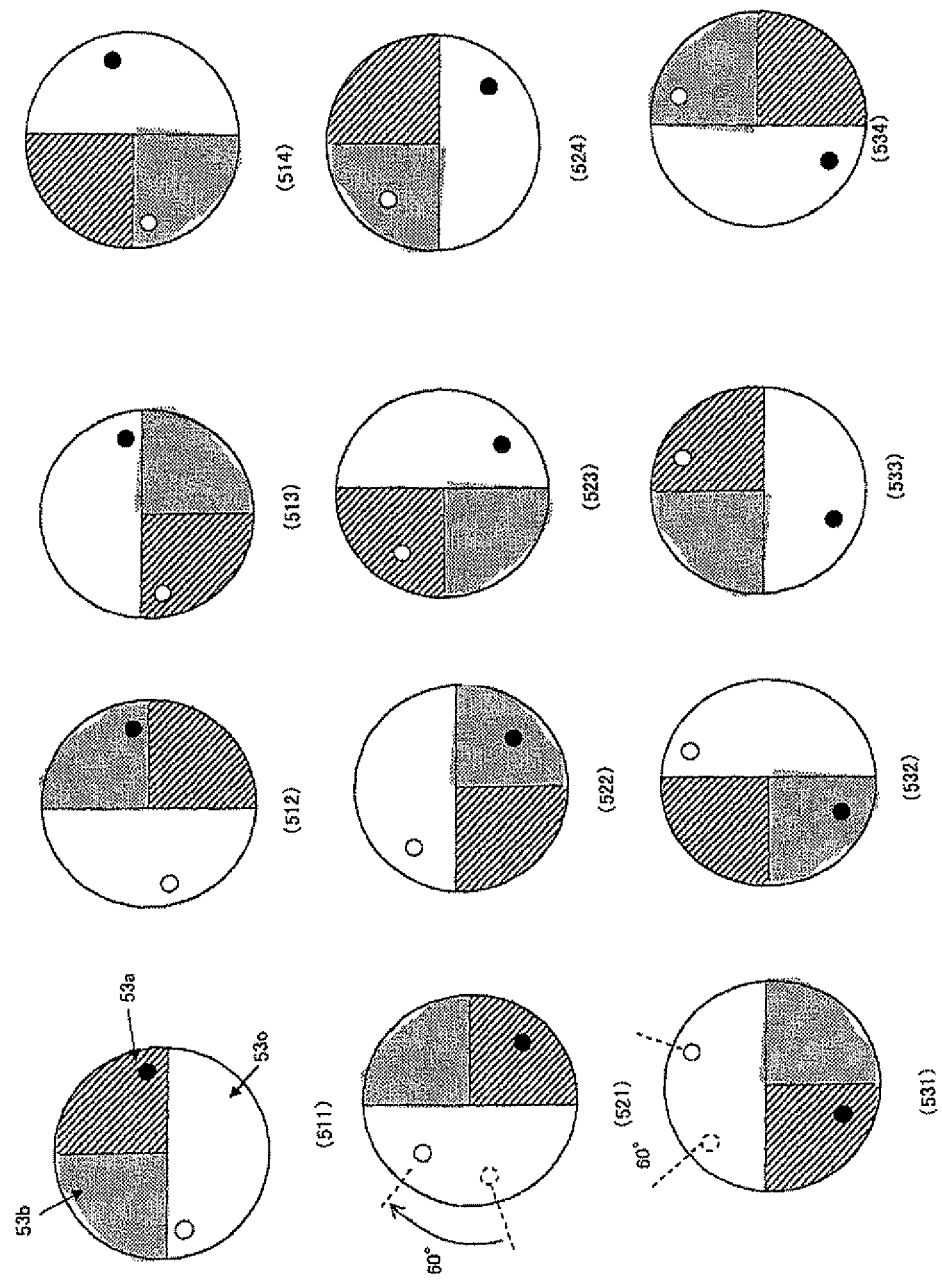
FIG. 5 is a view showing a schematic diagram of a phase plate used in Embodiment 1.3.

FIG. 5 illustrates an example of a phase plate 53 of Embodiment 1.3. In the phase plate 53, the sectorial center angles of regions 53a and 53b are set to 90°. In Embodiment 1.3, unlike Embodiment 1.2, a thickness of the region 53a is set to an amount corresponding to a phase difference of $\pi/4$ with respect to a region 53o while a thickness of the region 53b is set to an amount corresponding to a phase difference of $3\pi/4$ with respect to the region 53o.

In Embodiment 1.3, as illustrated in TABLE 3, a four-step phase modulation can be performed, in which four rotational positions of the phase plate 52 correspond to the four steps and a phase difference is changed by $2\alpha/4$ between two succeeding steps.

TABLE 3

| Rotational position | Phase difference between +1-order light and −1-order light |
|---|---|
| (511) | $-\pi/4 = 7\pi/4$ |
| (512) | $-3\pi/4 = 5\pi/4$ |
| (513) | $\pi/4$ |
| (514) | $3\pi/4$ |

The same holds true for the rotational positions (521) to (524) and the rotational positions (531) to (534) in which the two light beams are rotated by 60°.

For Embodiment 1.3, the number of phase difference steps in which an image is obtained is four and the number of regions is three. Therefore, the following equation is obtained, and the conditional expression (1) is satisfied:

$$[N/2]+1=[4/2]+1=3$$

Embodiment 1.3 is larger than Embodiment 1.2 in the center angle of the region although Embodiment 1.3 is equal to Embodiment 1.2 in the division number. Therefore, Embodiment 1.3 is suitable to the continuous rotation.

Embodiment 1.4

Figure 6:
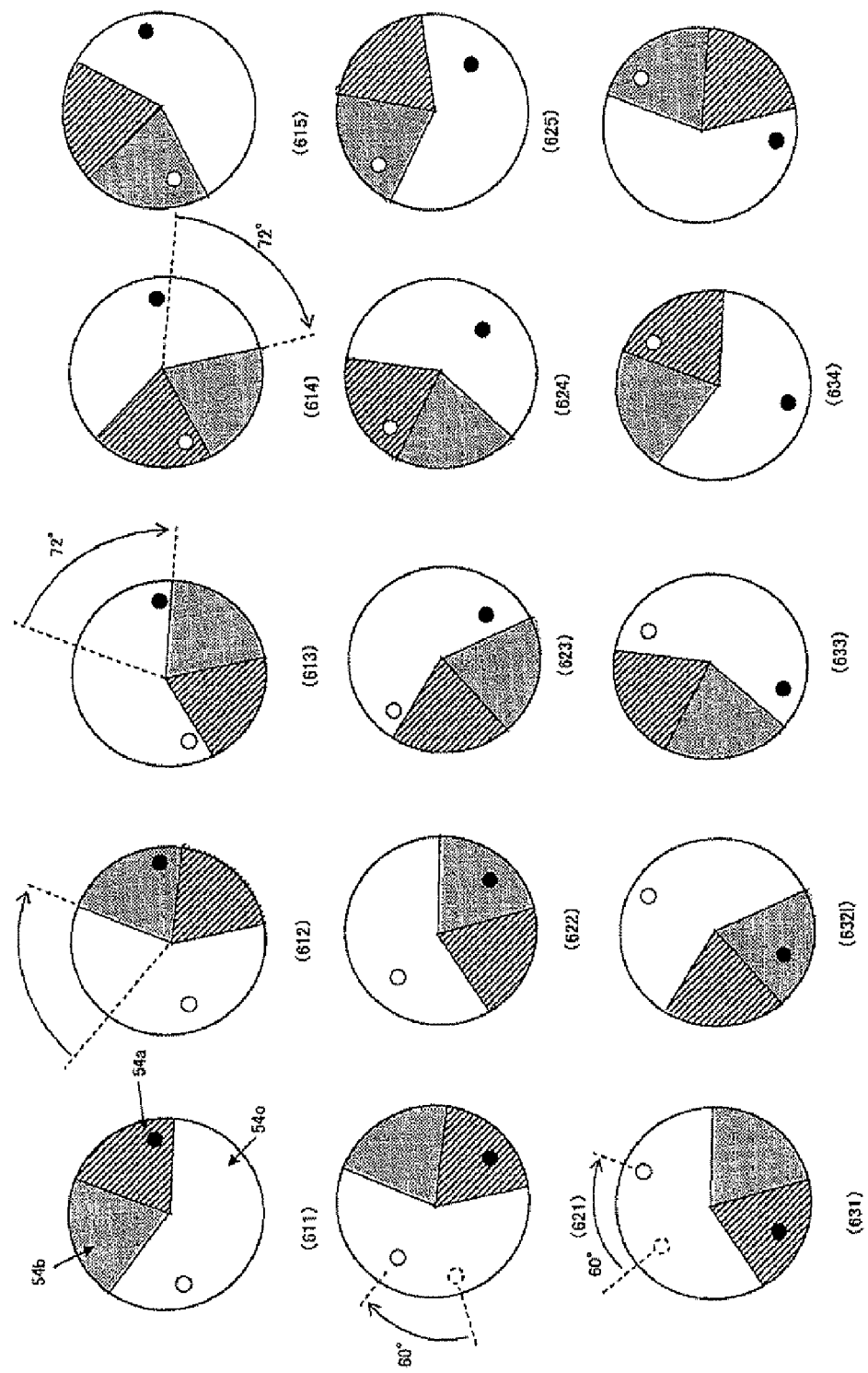
FIG. 6 is a view showing a schematic diagram of a phase plate used in Embodiment 1.5.

Embodiment 1.4 of the invention will be described below. Embodiment 1.4 is an example in which a phase difference is changed in five steps. FIG. 6 illustrates an example of a phase plate 54 of Embodiment 1.4. In the phase plate 54, a thickness of a region 54a is set to an amount corresponding to a phase difference of $2\pi/5$ with respect to a region 54o, and a thickness of the region 54b is set to an amount corresponding to a phase difference of $4\pi/5$ with respect to the region 54o.

In Embodiment 1.4, as illustrated in TABLE 4, a five-step phase modulation can be performed, in which five rotational positions of the phase plate 54 correspond to the five steps and a phase difference is changed by $2\pi/5$ between two succeeding steps.

TABLE 4

| Rotational position | Phase difference between +1-order light and −1-order light |
|---|---|
| (611) | $-2\pi/5 = 8\pi/5$ |
| (612) | $-4\pi/5 = 6\pi/5$ |
| (613) | 0 |
| (614) | $2\pi/5$ |
| (615) | $4\pi/5$ |

The same holds true for the case in which the two light beams are rotated by 60°.

For Embodiment 1.4, the number of phase difference steps in which an image is obtained is five and the number of regions is three. Therefore, the following equation is obtained, and the conditional expression (1) is satisfied:

$$[N/2]+1=[5/2]+1=3$$

Embodiment 1.5

Figure 7:
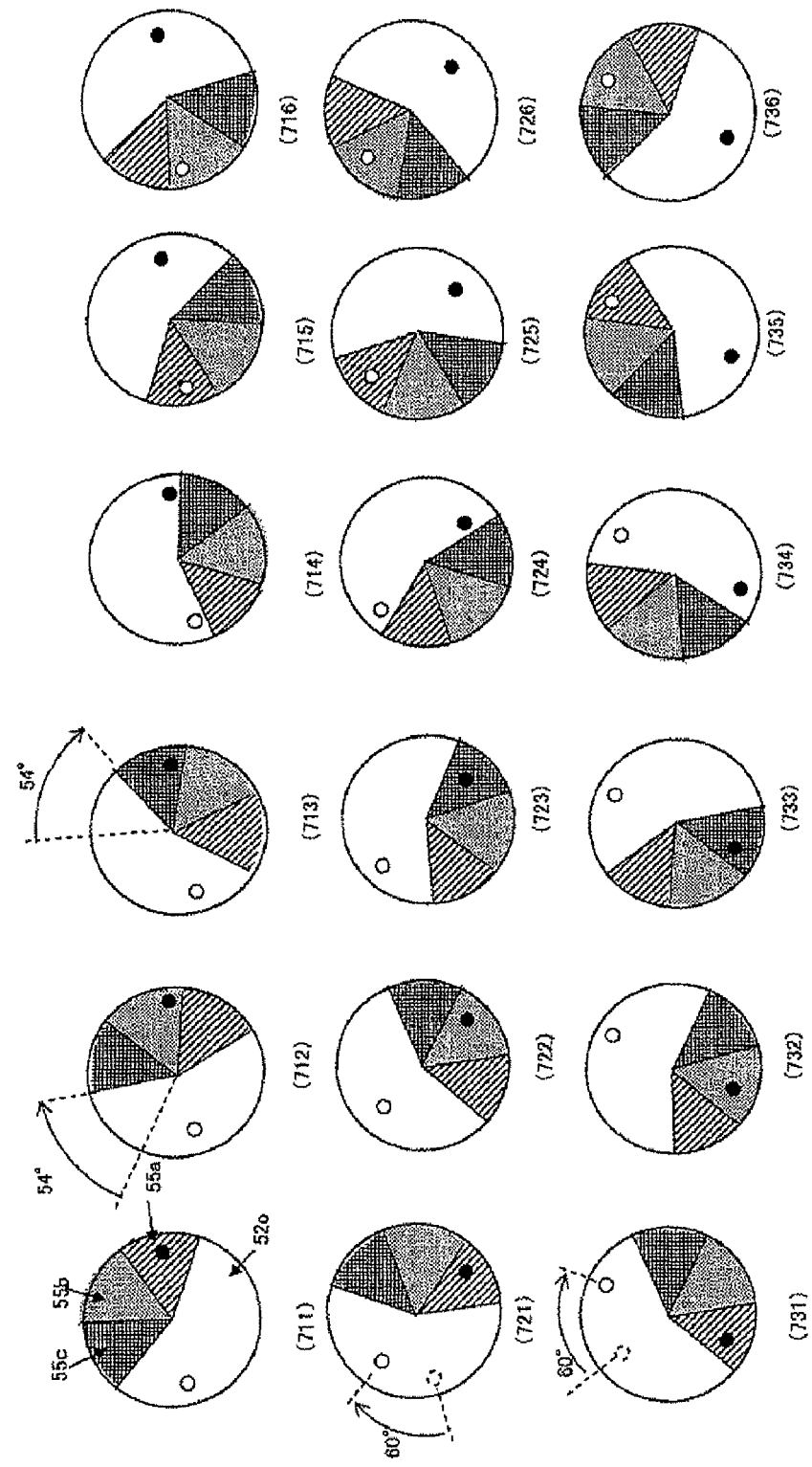
FIG. 7 is a view showing a schematic diagram of a phase plate used in Embodiment 1.6.

Embodiment 1.5 of the invention will be described below. Embodiment 1.5 is an example in which a phase difference is changed in six steps. FIG. 7 illustrates an example of a phase plate 55 of Embodiment 1.2. In the phase plate 55, a thickness of a region 55a is set to an amount corresponding to a phase difference of $2\pi/6$ with respect to a region 55o, a thickness of the region 55b is set to an amount corresponding to a phase difference of $4\pi/6$ with respect to the region 55o, and a thickness of the region 55c is set to an amount corresponding to a phase difference of $6\pi/6$ with respect to the region 55o.

In Embodiment 1.2, as illustrated in TABLE 5, a six-step phase modulation can be performed, in which six rotational positions of the phase plate 55 correspond to the six steps and a phase difference is changed by $2\pi/6$ between two succeeding steps.

TABLE 5

| Rotational position | Phase difference between +1-order light and −1-order light |
|---|---|
| (711) | $-2\pi/6 = 10\pi/6$ |
| (712) | $-4\pi/6 = 8\pi/6$ |
| (713) | $-6\pi/6 = 6\pi/6$ |
| (714) | 0 |
| (715) | $2\pi/6$ |
| (716) | $4\pi/6$ |

The same holds true for the case in which the two light beams are rotated by 60°.

For Embodiment 1.5, the number of phase difference steps in which an image is obtained is six and the number of regions is four. Therefore, the following equation is obtained, and the conditional expression (1) is satisfied:

$$[N/2]+1=[6/2]+1=4$$

Embodiment 1.6

Figure 8:
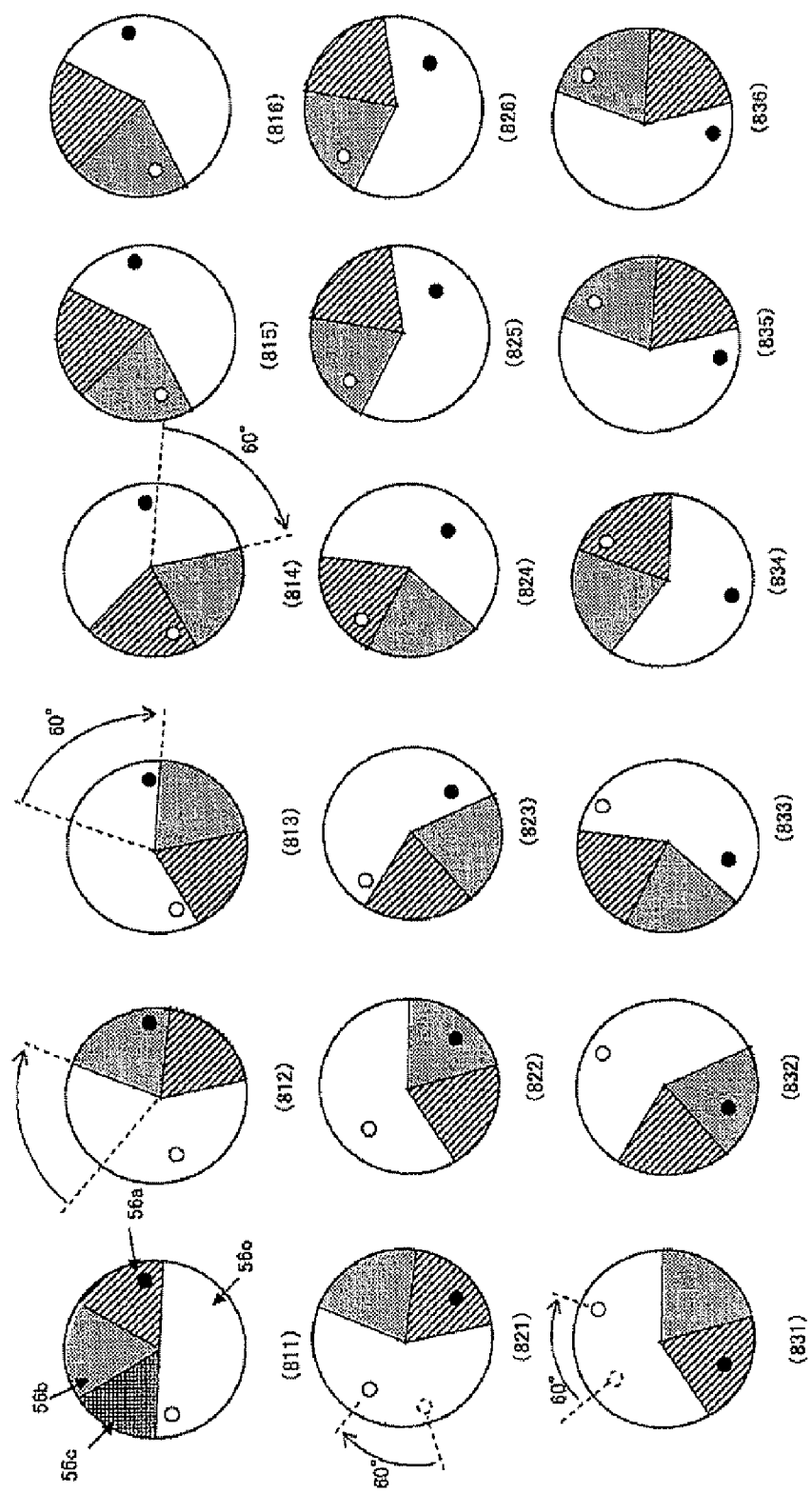
FIG. 8 is a view showing a schematic diagram of a phase plate used in Embodiment 1.7.

Embodiment 1.6 of the invention will be described below. Embodiment 1.6 is an example in which a phase difference is changed in six steps. FIG. 8 illustrates an example of a phase plate 56 of Embodiment 1.2. In the phase plate 56, a thickness of a region 56a is set to an amount corresponding to a phase difference of $\pi/6$ with respect to the region 56o, a thickness of a region 56b is set to an amount corresponding to a phase difference of $3\pi/6$ with respect to the region 56o, and a thickness of a region 56c is set to an amount corresponding to a phase difference of $5\pi/6$ with respect to the region 56o. In Embodiment 1.5, as illustrated in TABLE 6, a six-step phase modulation can be performed, in which six rotational positions of the phase plate 56 correspond to the six steps and a phase difference is changed by $2\pi/6$ between two succeeding steps.

TABLE 6

| Rotational position | Phase difference between +1-order light and −1-order light |
|---|---|
| (811) | −π/6 = 11π/6 |
| (812) | −3π/6 = 9π/6 |
| (813) | −5π/6 = 7π/6 |
| (814) | π/6 |
| (815) | 3π/6 |
| (816) | 5π/6 |

The same holds true for the case in which the two light beams are rotated by 60°.

For Embodiment 1.6, the number of phase difference steps in which an image is obtained is six and the number of regions is four. Therefore, the following equation is obtained, and the conditional expression (1) is satisfied:

[N/2]+1=[6/2]+1=4

Because Embodiment 1.6 is larger than Embodiment 1.5 in the center angle of the region, Embodiment 1.6 is suitable to the continuous rotation.

In Embodiments 1.1 to 1.6, it is necessary to divide the phase plate 5 in the following way. It is necessary that the two light beams can pass through each divided region. It is assumed that θ is a larger one of viewing angles of the two light beams when the phase plate is viewed from the rotating axis. Each region is of sectorial shape, the center of which is on the rotating axis and the center angle has the minimum value of θ. The sectorial region must have such a radius as includes the light beam located farther away from the rotating center, and must include regions through which the two light beams pass when being rotated about the rotating axis.

When the (X−1) regions exist, the sectorial region whose center angle is (X−1)θ is used for a minimum. Therefore, the maximum value of the center angle of one sectorial region becomes {2π−(X−1)θ}. Obviously the regions must not overlap each other.

Figure 9:
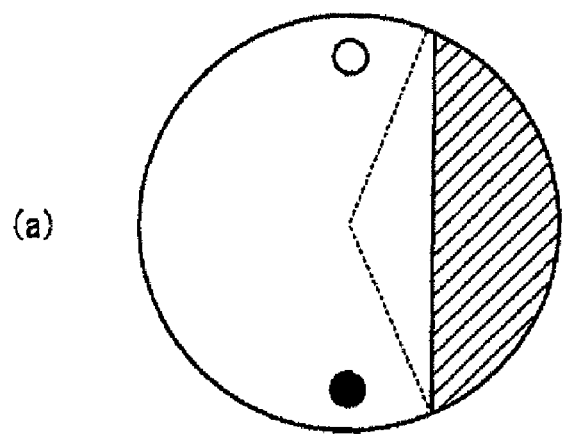
FIG. 9 is a view illustrating a variation of region division of the phase plate.
Figure 9:
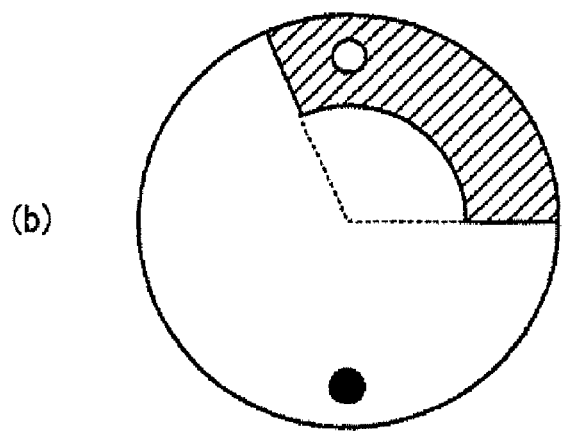
Figure 9:
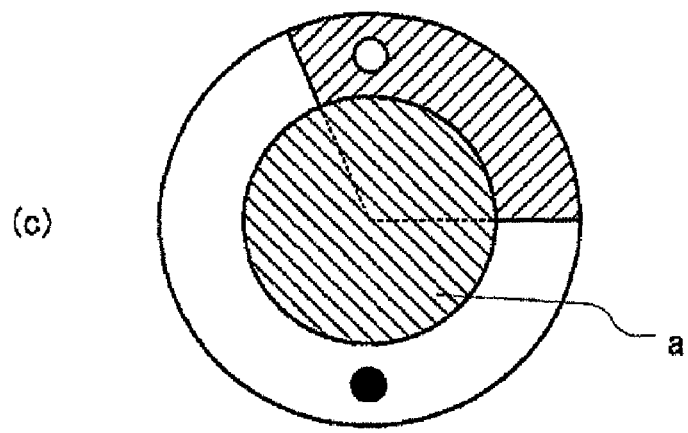

In Embodiments 1.1 to 1.6, each region is formed into the sectorial shape. For example, divided regions as shown in FIG. 9 can be used when the condition described above is satisfied. In FIG. 9, a small black circle indicates the +1-order light, while a small white circle indicates the −1-order light. In FIGS. 9(*a*) and 9(*b*), the phase plate is divided into two regions, and the condition described above is satisfied in each region by rotating the phase plate about the optical axis.

In FIG. 9(*c*), the phase plate is divided into three regions. A region a is an invalid region in which any effect is not produced in the invention, and the region a can be neglected. In actually producing the phase plate, such a invalid region can be included in various forms. However, regions recited in claims and the summary of the invention do not include such an invalid region.

Embodiment 2.1

Figure 10:
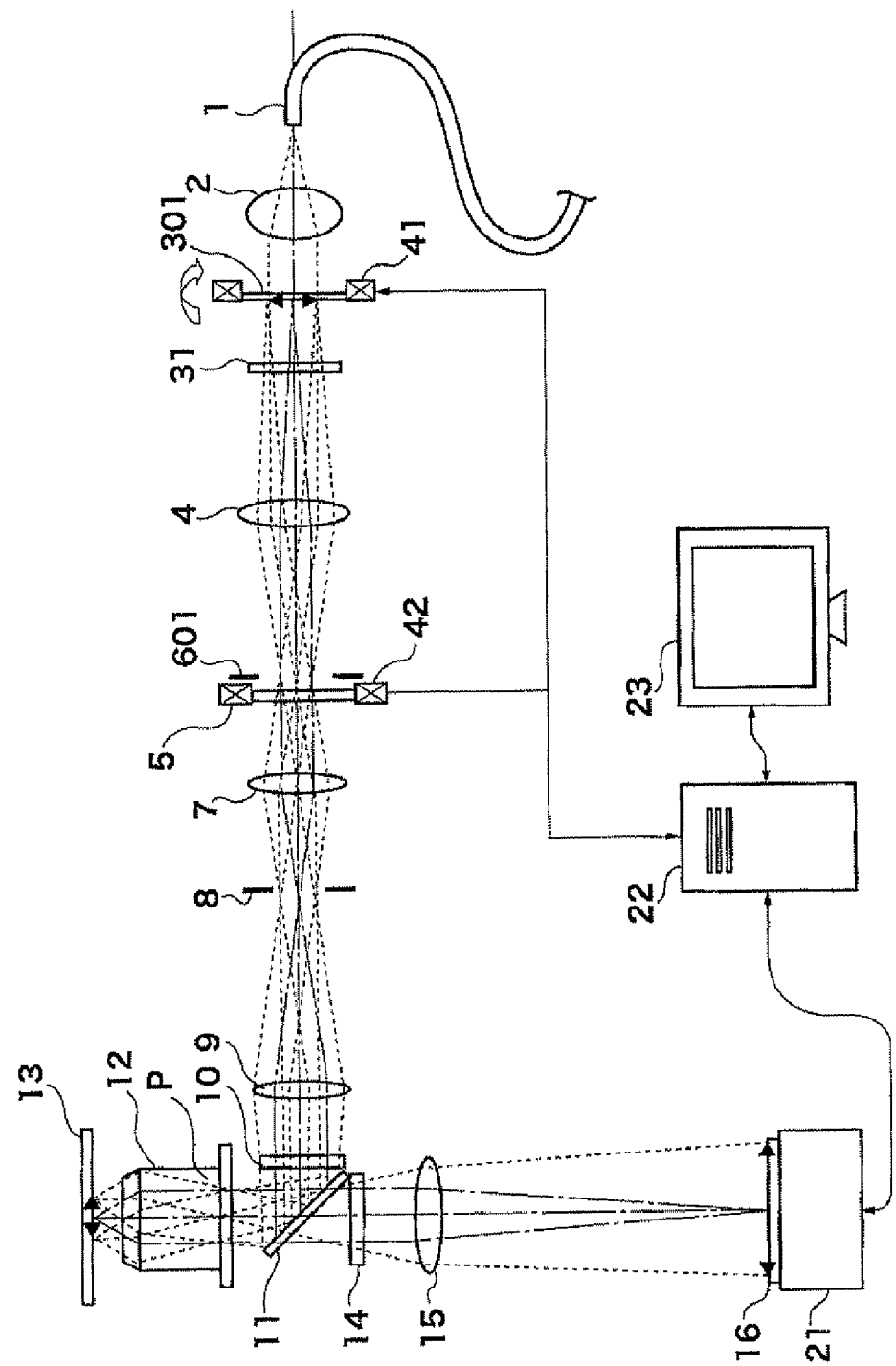
FIG. 10 is a view showing a schematic diagram of an optical system of a microscope device according to Embodiment 2.1 of the invention.

FIG. 10 is a view showing a schematic diagram of an optical system of a microscope device according to Embodiment 2.1 of the invention. Embodiment 2.1 differs from Embodiment 1.1 of FIG. 1 in a diffraction grating 301 and a high-order cut plate 601. That is, in Embodiment 2.1, the three-light-beam interference fringe is generated on the sample 13 using three light beams including 0-order and ±1-order light beams in the lights diffracted by the diffraction grating 301.

A duty ratio of a phase grating is set such that a strength ratio of the light diffracted by the diffraction grating 301 substantially becomes 0-order:+1-order:−1-order=1:1:1. Thus, desirably the strength ratio of the light diffracted by the diffraction grating 301 should become 0-order:+1-order:−1-order=1:1:1. However, when the desirable strength ratio is not obtained due to a production error and the like, an ND filter or the like may be placed inside the high-order cut plate 601 to adjust light quantity.

An interference fringe by the two ±1-order light beams and a double-period interference fringe by the 0-order and 1-order light beams and 0-order and −1-order light beams exist on the sample 13 while combined with each other. In the interference between the 0-order and 1-order light beams and the interference between the 0-order and −1-order light beams, because the pairing pieces of incident light are not symmetrical in relation to the optical axis, an interference fringe is also formed in the optical axis direction. As a result, the combined wave becomes an interference fringe having a structure not only in xy-direction (direction perpendicular to the optical axis) but also in z-direction (optical axis direction) on the sample 13.

The sample to which the structured illumination is performed by the three-light-beam interference fringe is modulated in the z-direction, in addition to the modulation in the xy-direction, which is similar to that in the embodiments in which the structured illumination is performed by the two-light-beam interference fringe. Therefore, a so-called sectioning image in which resolving power is improved in the z-direction is obtained when a modulated image is obtained and is subjected to a proper image arithmetic processing.

This is described in M. G. L. Gustafsson, D. A. Agard, J. W. Sedat "Doubling the lateral resolution of wide-field fluorescence microscopy using structured illumination", Proceedings of the SPIE—The International Society for Optical Engineering (2000) vol. 3919, p. 141-50 (Non-Patent Document 2).

There are five unknowns in the image restoring processing of the structures illumination by the three-light-beam interference (A total of seven components, that is, 0-order and ±1-order components existing in a plane of $f_z=0$ of the wave number space and four components existing in a plane of $f_z \neq 0$ of the wave number space, are included in the modulated image among components obtained from the spatial frequency information possessed by the sample by the structured illumination. However, investigation of the structure of the sample in the z-direction, that is, in the optical axis direction can be realized by moving the sample relative to the optical system by z-feed of a stage or the like. Therefore, in the components in the plane of $f_z \neq 0$ of the wave number space, it is not necessary to separate the two pairs in which only signs of $f_z$ differ from each other). Accordingly, it is necessary to obtain five phase modulation images for a minimum. The phase modulation amount should preferably be set as follows:

TABLE 7

| Image No. | Phase difference between +1-order light and −1-order light | Phase difference between +1-order light and 0-order light | Phase difference between 0-order light and −1-order light |
|---|---|---|---|
| 1 | 0 | 0 | 0 |
| 2 | 4π/5 | 2π/5 | 2π/5 |
| 3 | 8π/5 | 4π/5 | 4π/5 |
| 4 | 12π/5 | 6π/5 | 6π/5 |
| 5 | 16π/5 | 8π/5 | 8π/5 |

Therefore, a phase of the fringe generated by the interference of the ±1-order pieces of diffracted light is changed in two periods while a phase of the fringe generated by the interference of the 0-order and ±1-order pieces of diffracted light is changed in one period. As described above, although the image arithmetic processing can be performed when the phase change amount is uneven, disadvantageously the sample is faded into a fringe pattern.

Figure 11:
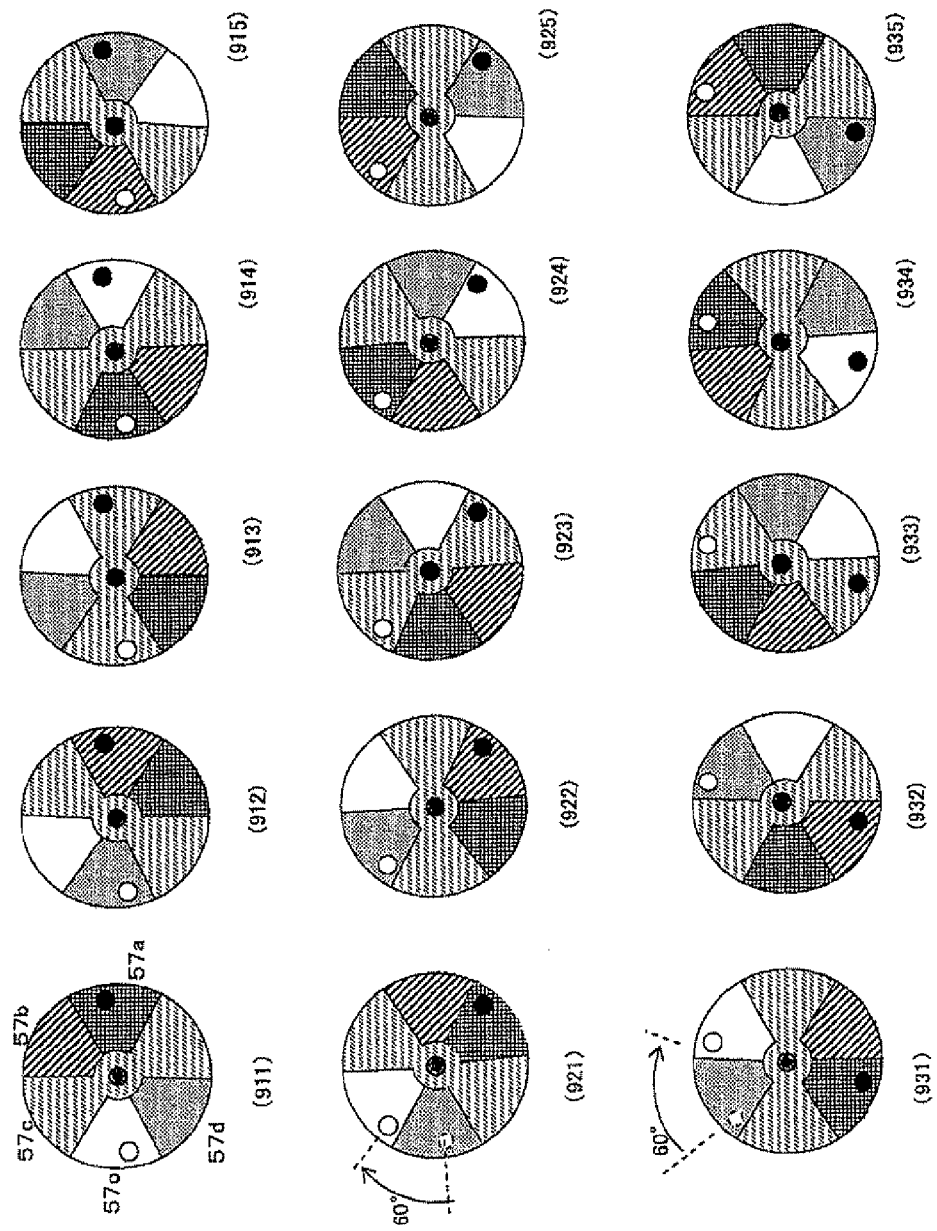
FIG. 11 is a view showing a schematic diagram of a phase plate used in Embodiment 2.1.

A five-step phase modulation is performed by rotating the phase plate 5 disposed in the proximity of the pupil conjugate position about the optical axis. FIG. 11 illustrates an example of a phase plate 57 of Embodiment 2.1. In the phase plate 57, a thickness of a region 57*a* is set to an amount corresponding to a phase difference of $16\pi/5$ with respect to a region 57*o*, a thickness of the region 57*b* is set to an amount corresponding to a phase difference of $14\pi/5$ with respect to the region 57*o*, a thickness of a region 57*c* is set to an amount corresponding to a phase difference of $8\pi/5$ with respect to the region 57*o*, and a thickness of a region 57*d* is set to an amount corresponding to a phase difference of $2\pi/5$ with respect to the region 57*o*.

In Embodiment 2.1, as illustrated in TABLE 8, a five-step phase modulation can be performed, in which five rotational positions of the phase plate 57 correspond to the five steps and a phase difference between the ±1-order lights is changed by $4\pi/5$ between two succeeding steps and a phase difference between the +1-order light and 0-order light and the 0-order light and −1-order light is changed by $2\pi/5$ between two succeeding steps.

TABLE 8

| Rotational position | Phase difference between +1-order light and −1-order light | Phase difference between +1-order light and 0-order light | Phase difference between 0-order light and −1-order light |
|---|---|---|---|
| (911) | $-16\pi/5 = 4\pi/5$ | $-8\pi/5 = 2\pi/5$ | $2\pi/5$ |
| (912) | $-12\pi/5 = 8\pi/5$ | $-6\pi/5 = 4\pi/5$ | $4\pi/5$ |
| (913) | 0 | 0 | 0 |
| (914) | $16\pi/5$ | $8\pi/5$ | $8\pi/5$ |
| (915) | $12\pi/5$ | $6\pi/5$ | $6\pi/5$ |

The same holds true for the case in which the two light beams are rotated by 60°.

For Embodiment 2.1, the number of phase difference steps in which an image is obtained by the three-light beam interference is five and the number of regions is five. Therefore, the following equation is obtained, and the conditional expression (2) is satisfied:

$$N=5$$

Embodiment 2.2

Figure 12:
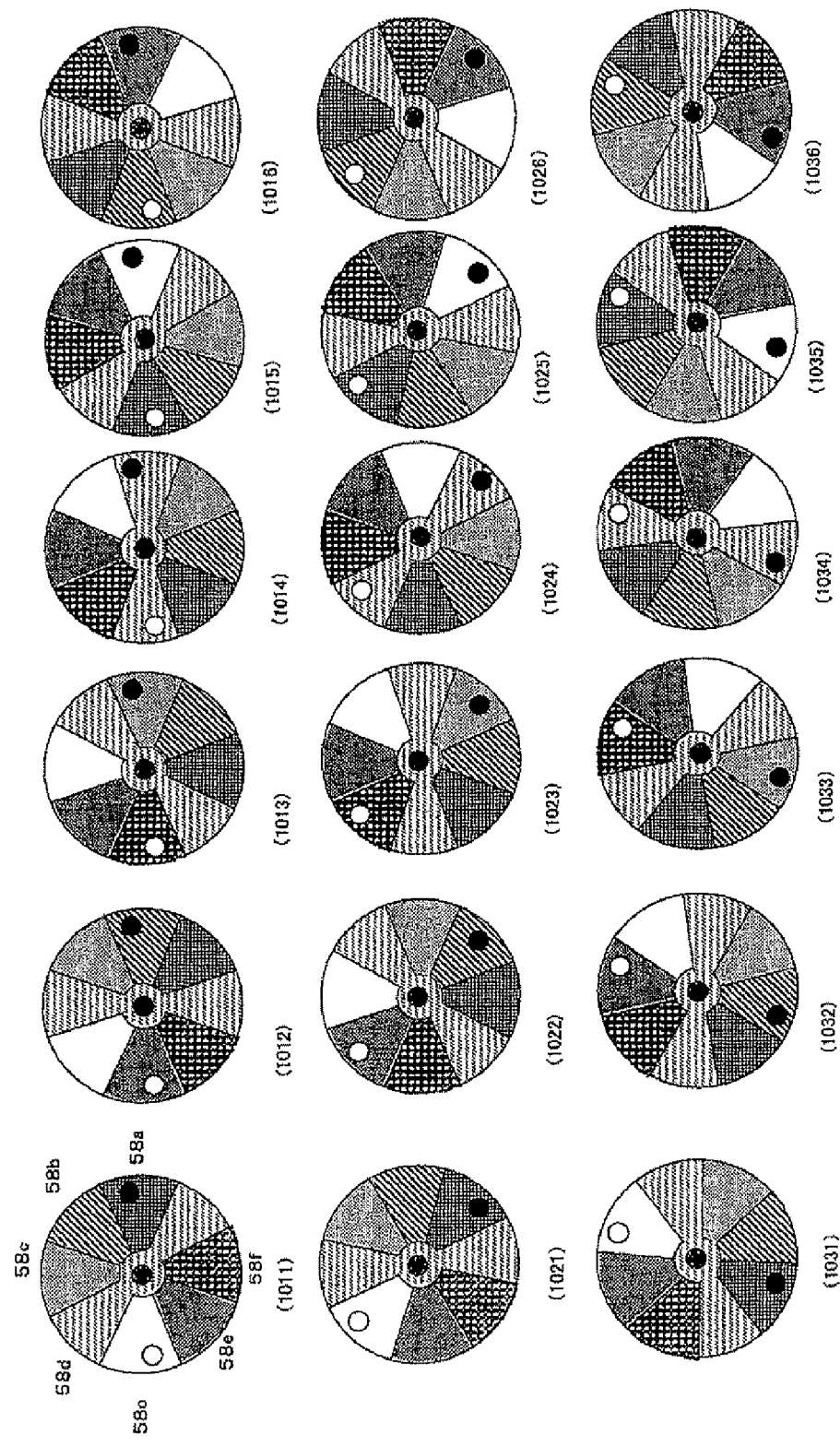
FIG. 12 is a view showing a schematic diagram of a phase plate used in Embodiment 2.2.

Embodiment 2.2 is Identical to Embodiment 2.1 of FIG. 10 in the configuration of the microscope, and Embodiment 2.2 differs from Embodiment 2.1 only in the configuration of the phase plate 5. In Embodiment 2.2, a phase difference is changed in six steps. FIG. 12 illustrates a configuration of a phase plate 58 used in Embodiment 2.2. In the phase plate 58, a thickness of a region 58*a* is set to an amount corresponding to a phase difference of $20\pi/6$ with respect to a region 58*o*, a thickness of a region 58*b* is set to an amount corresponding to a phase difference of $18\pi/6$ with respect to the region 58*o*, a thickness of a region 58*c* is set to an amount corresponding to a phase difference of $16\pi/6$ with respect to the region 58*o*, a thickness of a region 58*d* is set to an amount corresponding to a phase difference of $10\pi/6$ with respect to the region 58*o*, a thickness of a region 58*e* is set to an amount corresponding to a phase difference of $2\pi/6$ with respect to the region 58*o*, and a thickness of a region 58*f* is set to an amount corresponding to a phase difference of $4\pi/6$ with respect to the region 58*o*.

In Embodiment 2.2, as illustrated in TABLE 9, a six-step phase modulation can be performed, in which six rotational positions of the phase plate 58 correspond to the six steps and a phase difference between the ±1-order lights is changed by $4\pi/6$ between two succeeding steps and a phase difference between the +1-order light and 0-order light and the 0-order light and −1-order light is changed by $2\pi/6$ between two succeeding steps.

TABLE 9

| Rotational position | Phase difference between +1-order light and −1-order light | Phase difference between +1-order light and 0-order light | Phase difference between 0-order light and −1-order light |
|---|---|---|---|
| (1011) | $-20\pi/6 = 4\pi/6$ | $-10\pi/6 = 2\pi/6$ | $2\pi/6$ |
| (1012) | $-16\pi/6 = 8\pi/6$ | $-8\pi/6 = 4\pi/6$ | $4\pi/6$ |
| (1013) | $12\pi/6$ | $6\pi/6$ | $6\pi/6$ |
| (1014) | 0 | 0 | 0 |
| (1015) | $-20\pi/6 = 4\pi/6$ | $-10\pi/6 = 2\pi/6$ | $2\pi/6$ |
| (1016) | $-16\pi/6 = 8\pi/6$ | $-8\pi/6 = 4\pi/6$ | $4\pi/6$ |

The same holds true for the case in which the two light beams are rotated by 60°.

For Embodiment 2.2, the number of phase difference steps in which an image is obtained by the three-light beam interference is six and the number of regions is seven. Therefore, the following equation is obtained, and the conditional expression (2) is satisfied:

$$N=6+1=7$$

In Embodiments 2.1 and 2.2, it is necessary to divide the phase plate 5 in the following way. It is necessary that the two light beams located farther away from the rotating center among the three light beams, can pass through each divided region. It is assumed that $\theta$ is the largest one of viewing angles of the three light beams when the phase plate is viewed from the rotating axis. Each region is of sectorial shape, the center of which is on the rotating axis and the center angle has the minimum value of $\theta$. The sectorial region must have such a radius as includes the light beam located farthest away from the rotating center among the three light beams, and must include regions through which the two light beams located farther away from the rotating center among the three light beams pass when being rotated about the rotating axis.

It is also necessary that one region be formed into a shape in which the three light beams are simultaneously transmitted. Because the 0-order light passes usually through the optical axis, it is necessary that the region be formed so as to include the optical axis. By the region, the phase plate 5 is divided into two regions, and each region is divided into $(X-1)/2$. Therefore, the maximum value of the center angle of one sectorial region of one region becomes $\{\pi-(X-1)\theta/2\}$. Obviously the regions must not overlap each other.

Figure 13:
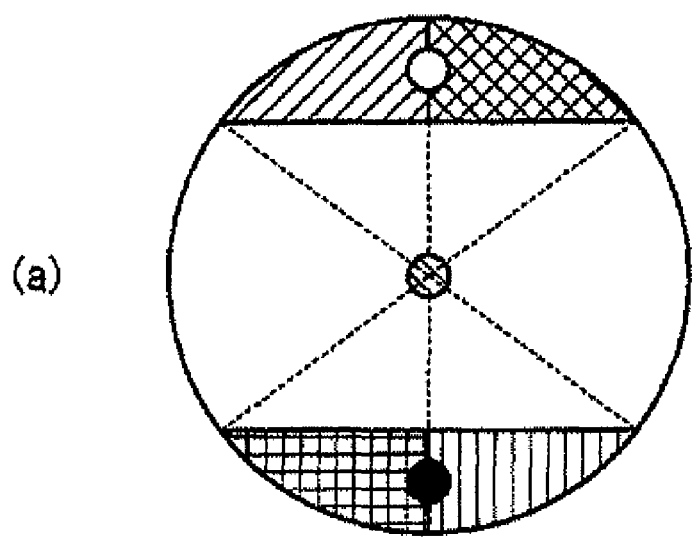
FIG. 13 is a view illustrating a variation of region division of the phase plate.
Figure 13:
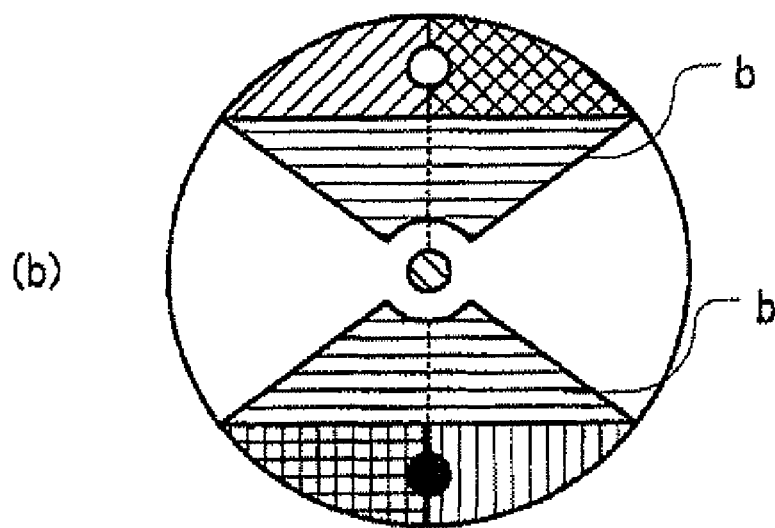

For example, the region division of FIG. 13 can be used when the condition is satisfied. In FIG. 13, a small black circle indicates the +1-order light, a small white circle indicates the −1-order light, and a small hatched circle indicates the 0-order light. In FIG. 13(*a*), the phase plate is divided into five regions, and the condition is satisfied in each region by rotating the phase plate about the optical axis.

In FIG. 13(*b*), the phase plate is divided into seven regions, a region b is an invalid region in which any effect is not produced in the invention, and the region b can be neglected. In actually producing the phase plate, such an invalid region can be included in various forms. However, such an invalid region can be included in various forms. However, regions recited in claims and the summary of the invention do not include such an invalid region.

In the embodiments, a diffraction grating is used as light beam splitting means for splitting the light beam emitted from the coherent light source into plural light beams. In addition to a diffraction grating, for example, a polarization beam splitter, a half mirror, and a bundle optical fiber having one entrance and plural exits can be used as the light beam splitting means.

The invention claimed is:

1. A microscope device comprising:
an illumination optical system that includes a coherent light source, light beam splitting means for splitting a light beam from the coherent light source into a plurality of light beams, and phase modulation means for performing phase modulation to two light beams in the plurality of light beams collected into a pupil conjugate plane, the phase modulation means being disposed in a proximity of the pupil conjugate plane, the illumination optical system illuminating a surface of a sample with illumination light in which the two light beams are spatial-modulated into an interference fringe structure by interference of the two light beams in the proximity of the surface of the sample;
an image-formation optical system that forms an image of light from the sample to which the modulation is performed by the illumination light;
imaging means; and
image processing means for producing a sample image by performing arithmetic processing to an image, the image being taken by the imaging means each time the phase modulation is performed to the two light beams,
wherein the phase modulation means is an optical member that is set such that when light passes respective regions of the optical member different phase differences are generated in the respective regions,
the phase modulation means changes a phase difference between the two light beams by rotation of the optical member, and
the phase modulation means satisfies the following conditions:
(1) the number of regions X and the number of times of the spatial modulation N satisfy the following equation:

$$X = [N/2] + 1 \quad (1)$$

where [ ] is a Gaussian sign, and the Gaussian sign indicates a maximum integer that does not exceeds a numerical value described in [ ],
(2) (a) assuming that θ is a larger one of potential angles of the two light beams when the optical member is viewed from a rotating axis,
(b) each region of the optical member is of sectorial shape, a center of the sectorial shape is on the rotating axis and a center angle has a minimum value of θ, the center angle has a maximum value of {2π−(X−1)θ}, the region of sectorial shape has such a radius as includes the light beam located farther away from the rotating center in the two light beams and can include regions through which the two light beams pass when being rotated about the rotating axis, and
(c) the regions of the optical member do not overlap each other.

2. The microscope device according to claim 1, wherein the phase modulation means includes blocking means for blocking illumination light unnecessary for the spatial modulation.

3. The microscope device according to claim 1, wherein the phase modulation means includes attenuating means for attenuating illumination light unnecessary for the spatial modulation.

4. A microscope device comprising:
an illumination optical system that includes a coherent light source, light beam splitting means for splitting a light beam from the coherent light source into a plurality of light beams, and phase modulation means for performing phase modulation to three light beams in the plurality of light beams collected into a pupil conjugate plane, the phase modulation means being disposed in a proximity of the pupil conjugate plane, the illumination optical system illuminating a surface of a sample with illumination light in which the three light beams are spatial-modulated into an interference fringe structure by interference of the three light beams in the proximity of the surface of the sample;
an image-formation optical system that forms an image of light from the sample to which the modulation is performed by the illumination light;
imaging means; and
image processing means for producing a sample image by performing arithmetic processing to an image, the image being taken by the imaging means each time the phase modulation is performed to the three light beams,
wherein the phase modulation means is an optical member that is set such that when light passes respective regions of the optical member different phase differences are generated in the respective regions,
the phase modulation means changes phase differences between the three light beams by rotation of the optical member, and
the phase modulation means satisfies the following conditions:
(1) the number of regions X and the number of times of the spatial modulation N satisfy the following equation:

$X = N$ (when N is an odd number)

$$X = N+1 \text{ (N is an even number)} \quad (2)$$

(2)(a) assuming that θ is a largest one of potential angles of the two light beams when the optical member is viewed from a rotating axis,
(b) each region of the optical member is of sectorial shape, a center of the sectorial shape is on the rotating axis and a center angle has a minimum value of θ, the center angle has a maximum value of {2π−(X−1)θ}, the region of sectorial shape has such a radius as includes the light beam located farthest away from the rotating center in the three light beams and can include regions through which the three light beams pass when being rotated about the rotating axis, and,
(c) one of the regions of the optical member is formed into a shape through which the three light beams are simultaneously transmitted, and
(d) the regions of the optical member do not overlap each other.

5. The microscope device according to claim 4, wherein the phase modulation means includes blocking means for blocking illumination light unnecessary for the spatial modulation.

6. The microscope device according to claim 2, wherein the phase modulation means includes attenuating means for attenuating illumination light unnecessary for the spatial modulation.

* * * * *